March 24, 1970    A. HARTEL ET AL    3,501,852
COLOR SCALES FOR ANALYTICAL AND DIAGNOSTIC PURPOSES
Filed March 10, 1967    2 Sheets-Sheet 1

INVENTORS
ARNOLD HARTEL
HERMANN LANG

BY *J. William Miller*

ATTORNEY 3,501,852
COLOR SCALES FOR ANALYTICAL AND
DIAGNOSTIC PURPOSES
Arnold Hartel and Hermann Lang, Darmstadt, Germany, assignors to E. Merck A.G., Darmstadt, Germany
Filed Mar. 10, 1967, Ser. No. 622,189
Claims priority, application Germany, Mar. 12, 1966, M 68,752
Int. Cl. G09b 29/00
U.S. Cl. 35—28.3     3 Claims

ABSTRACT OF THE DISCLOSURE

Printed color scales for evaluating colorimetric reactions, the scale being a continuous spectrum in the applicable range printed by the half-tone four-color technique and calibrated after printing.

---

Applicants hereby claim the benefit of the filing date of German patent application M 68,752 filed Mar. 12, 1966.

This invention relates to the production of color scales, charts and the like, and in particular to such color scales useful for comparing colors obtained by chemical reactions in the presence of an indicator.

Color scales for the comparative evaluation of colorimetric reactions are very important in many areas of science and technology. For example, the use of such scales is of particular significance for the determination of indicator and test paper colors. In this procedure, an indicator or test paper, for example, is immersed in a solution of the substance to be examined; the color hue obtained thereby is compared with the shades on a color scale calibrated for the respective color reaction; and the calibrated value corresponding to the produced color is read off from the scale. For example, the pH value of a solution can be determined in this manner.

However, for reliable and reproducible results, there are serious problems in the production as well as in the utilization of the previously known standard color scales for the evaluation of color reactions. In the known printed scales, a particular disadvantage is that the scales are composed of individual color stages, thereby yielding a discontinuous function of the property being measured. Accordingly, the correlation of shades and hues between these discontinuous stages cannot be accomplished with the desired degree of precision. Additionally, the accuracy of the read-off information is directly dependent upon the quality of the reproduction of the color print. Because of these facts, errors in evaluation are not only inherent in technique, but also great reliance is made on the color perception and skill of the printer.

A further disadvantage in connection with the production of the previously employed discontinuous color scales printed on a carrier (as they are used, for example, in the determination of the hues of pH indicators) resides in that particular predetermined values of pH are calibrated with individual color shades to select standards; thereupon each individual color shade that is printed must match in its hue with the respective standard. Because of the latter fact, the use of the conventional, relatively simple four-color print process is not readily amenable to the printing of such discontinuous color scales due to the exceptional difficulties in the production of highly accurate half-tone zinc plates. Therefore, in practice, these discontinuous color scales are produced by the expensive full-color printing process, wherein the printing colors for each individual shade of color of the scale must be mixed separately. This delicate adjustment of the various colors is, however, extraordinarily difficult also in this process, even for experienced color printers. For each individual color of the scale, the carriers, for example, paper, must be passed through the printing machine, and individual adjustments in chromatic saturation must be made each time. If a color does not measure up to standard, the entire charge must be discarded. Each new printing run of the printed color scale requires, once again, the conductance of practically all the above process steps.

An object of this invention therefore is to provide an easier method for the production of color scales.

Another object is to provide novel continuous color scales which are more reliable and readable than discontinuous scales.

Upon further study of the specification and claims, other objects and advantages of the present invention will become apparent.

Figure 1:
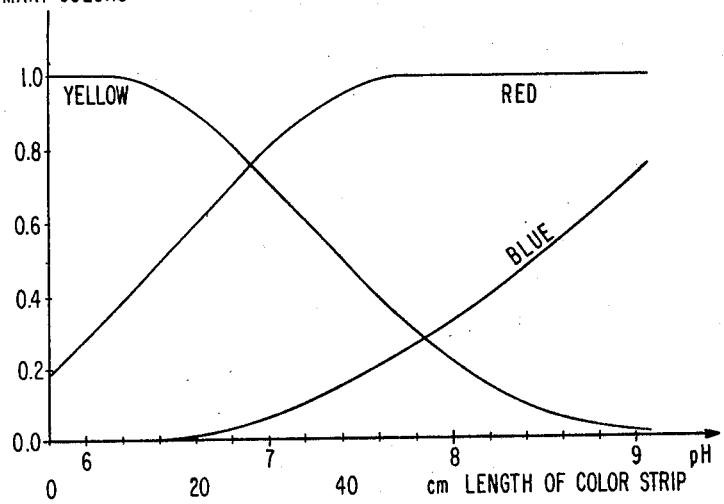
FIGURE 1 is a graph showing the relationship between the primary colors and pH along a length of color strip.

To attain the above objects, there is provided a method of printing onto a carrier a band of color containing, in a continuous transition, all shades, hues and tints of color occurring in the respective colorimetric reaction. The printing steps are based on half-tone techniques, and the color band is calibrated only after being applied to the carrier.

Because the band of color is not calibrated until after it has been applied to the carrier, the color stripe of this invention can be printed by the conventional four-color process. Since only three "primary" colors are employed in this process, there is thus eliminated the mixing of individual color shades, as had to be done by the printer for the production of the previously employed discontinuous scales. In the printing of the primary colors blue, red, yellow and, if desired, black, which printing has to be done once for each color, only three to four matching steps in total on the printing press are required with respect to chromaticity. If, at some place along the printed scale, a color is inadvertently applied too strongly during printing, compensation can be made for this error, in most cases, during the subsequent calibrating procedure.

Furthermore, there is the advantageous feature that, when using the four-color half-tone printing process for the production of the color scales of this invention, upon a new edition the band of color can be printed with an identical quality by using the zinc plates prepared for the first edition, without little extra work.

By employing the novel continuous color scale of this invention, greater accuracy and better reproducibility are attained in the evaluation of color reactions. Thus, color hues positioned between two successive color stages of a discontinuous color scale can be correlated without interpolation to an intermediate value in the continuous band of color of this invention. Furthermore, because of the subsequent calibration of the color strip, accuracy of read-off is likewise improved.

Still another advantage resides in the fact that, when printing the color scale according to the invention, the individual hues can be lengthened or shortened in any desired areas. Therefore, it is possible to produce a color scale which is not calibrated linearly, i.e., the calibration lines are spread out in certain regions and crowded in other regions. Such calibration affords advantages, for example, in color scales serving for the evaluation of color reactions of diagnostic test papers. In the diagnostically interesting areas, the hues are made wide, so that the calibration lines have larger spacings therebeween in these areas and thus make a more accurate reading possible, while in those color regions of the scale where the color values need merely be roughly estimated, the calibration lines can be grouped more closely together.

The band of color according to this invention is printed on the carrier by the half-tone process. Suitable carriers are solid printable materials having smooth surfaces, preferably paper, cardboard, or foils of suitable synthetic polymers, for example, printable polymeric hydrocarbons, as well as polyvinyl chloride, polyvinylidene chloride, polystyrene, polyamides, polycarbonates, urea-formaldehyde condensates, etc. It is preferred, however, for the color scale to be printed on an opaque material such as paper or cardboard.

Whereas the color scale of this invention is particularly useful for the evaluation of reactions that yield color to treated paper strips, it is also possible to evaluate corresponding color reaction occurring in a transparent medium, for example, in a solution, with the aid of the color comparison scale of this invention. Of course, the color scale can also be printed on a transparent film, such as polyvinylidene chloride and, if desired, it can be mounted on an opaque white base, for example, paper, for purposes of comparison.

Particularly advantageous color scales of this invention are those having a rectangular configuration (about .3 to 3, preferably 1 to 2 cm. wide and about 5 to 30, preferably 15 to 20 cm. long) or an annular shape (about .3 to 3, preferably 1 to 2 cm. in wdth of band and 5 to 50, preferably 15 to 20 cm. median annular circumference).

The half-tone plates necessary for the printing step are produced by determining the proportion of the primary colors in a number of predetermined calibrated colors and thereafter transfering the thus-obtained primary color proportions into corresponding continuously merging half-tone values.

The printing of the color strip by the half-tone process is conducted in a conventional manner. Thus, the color strip of this invention can be printed by all conventional relief, intaglio, or planographic printing processes.

The preferred method for producing the color scale of this invention is as follows:

At first, several calibrating colors are produced by acting the substances to be tested in varying concentrations, for example, by moistening test paper with solutions of various concentrations of the substances to be examined. For each calibrating color, the proportion of the basic colors is determined with the aid of commercially available color value tables or color mixing charts. In a color value table or color mixing chart, the respective proportions of the basic colors are listed for, in the order of magnitude, 1000 colors.) Thereafter, the primary colors listed in the color value table or in the color mixing chart are sprayed, with the aid of a spray, onto a base, for example, a sheet of paper, successively, so that the proportions of each basic color in the calibrating values correspond to the proportions predetermined from the color analysis, and so that the individual hues of the calibrating values merge continuously. If desired, the hues are then completely matched with the calibrating colors by spraying highly diluted solutions of the basic colors thereon. The thus-produced color strip is composed of numerous small dots of the basic colors employed.

The individual dots are no more perceptible in the finished printed color scale, since the pattern is photographically reduced for producing the zinc half-tone plates of the photoengraving process. On the basis of the thus-completed sample, the corresponding metal plates for printing the color strip are manufactured photographically in a conventional manner.

After printing, the color strip is calibrated by comparison with the original calibrating colors, i.e., graduating lines are placed at the respective shades of the scale corresponding to the concentration of the subsance to be examined.

The transfer of the proportions of primary colors de- determined in the given calibrating colors in accordance with the color analysis, as set out above, into corresponding half-tone (screen) values can be conducted also in any other suitable manner. Thus, it is possible, for example, to produce a sample for the production of the plates by painting the primary colors on a base, for example, a sheet of paper, in the proportions determined from the calibrating colors, and have the individual color shades continuously merge with one another. By a subsequent, if desired, repeated application of diluted solutions of the primary colors, the hues of the color strip can be completely matched with the calibrating colors. The production of the printing plates inaccordance with the thus-obtained sample is conducted in a conventional manner.

It is likewise possible to convert the proportions of primary colors determined for the comparison scale according to the color analysis of the calibrating colors directly into corresponding half-tone (screen) values, without producing a sample color strip. This can be done, for example, by providing, for each basic color, an enlarged half-tone picture which is then photographically reduced and transferred to the zinc plate. For each primary color there is drawn, in this embodiment, a grid of vertical and horizontal lines on a light surface, for example, a piece of paper of a suitable size (for example, 30 x 300 cm.), the lines of this grid having a suitable spacing from one another, for example, 2 mm. The thickness of the lines is continuously varied so that the rectangles thus produced have an area corresponding to the respective relative proportion of the basic color at the respective location of the sample. By photographically reducing at a suitable ratio, for example, at a ratio of 1:50, the half-tone picture is thus obtained which is used for etching the zinc plate in a conventional manner.

In another embodiment, the screen dots of varying size for each primary color are produced as follows. A conventional screen plate (i.e., one of the commercially available, transparent grid plates with 20 to 80 screen dots per cm. length) is placed on a light-sensitive film; a light-impermeable plate is used to cover up this firm, and then the film is exposed. Thereafter, the cover plate is continuously removed, at varying speed, so that the individual sections are exposed for differently long periods of time and thus are different with respect to their dark shading after the film has been developed. The developed film is then employed in a conventional manner for producing the metal grids.

The color scales of this invention can be employed for the evaluation of any desired color reactions, such as described, for example, in the company leaflet "Anfärbereagenzien für Dünnschicht- und Papier-Chromatographile" [Coloring Reagents for Thin-Layer and Paper Chromatography] (1961) by E. Merck A.G., Darmstadt. Thus, it is possible, for example, to evaluate, by means of a correspondingly calibrated color strip, color reactions for the concentration of inorganic substances (or ions). The following reactions are examples of those which can be evaluated:

Color changes of pH indicators (e.g., thymol blue, naphtholphthalein, phenol red, methyl orange, 3,5-dinitrobenzenesulfonic acid-(1)-2-azo-4-naphthol-(1), β-naphthol violet) for measuring the pH.

Color change of redox indicators (for example, potassium iodide/starch, peroxidase/anisidine, tetrazole salts, e.g., 3 - [3,5-dimethylthiazolyl-(2)]-2,5 - diphenyltetrazolium bromide, or leuco pigments) for measuring oxidizing and/or reducing compounds (for example, $H_2O_2$).

Color changes of group indicators, e.g., ninhydrin for measuring amino acids and primary amines; dinitrophenyl hydrazine for measuring ketones; or benzidine and sodium metaperiodate for the determination of polyvalent alcohols (e.g., sugars). In these cases, a color comparison scale is of particular importance for the semiquantitative evaluation of chromatograms.

Color changes of non-specific coloring substances with a reaction partner of a specific reaction, e.g., glucose determination with glucose oxidase, peroxidase, and dianisidine; lactic acid detection with lactate dehydrogenase, nicotinamide adenine dinucleotide (NAD), phenazine methosulfate, and tetrazole salts.

Color changes in connection with specific reactants, for example, cyanoferrate(II) for Fe(III) ions.

Particularly advantageous are color scales for the evaluation of color changes of indicator mixtures, particularly pH-indicator mixtures, e.g., α-naphtholphthalein/ phenol red or hexamethoxy red/methyl red/Congo red/ phenol red/naphtholphthalein/thymol phthalein/nitramine, or other mixed indicators, as set forth, for example, in "Biochemisches Taschenbuch" (Biochemical Handbook), Springer Editors, Berlin, vol. II, p. 109 (1964). The scale is suitably calibrated by entering, at the calibration lines, the concentrations of the compounds yielding the color reactions. Thus, a color scale for evaluating the hues of a pH-indicator is calibrated, for example, by entering the pH values on the basis of the predetermined calibrating colors at the calibration lines at spacings of, for instance, 0.2 pH unit.

A particularly useful color scale produced according to this invention is calibrated on the basis of the velocity of a color change caused by a mixture of acetyl choline or an acetyl choline salt with the enzyme cholinesterase in the presence of the indicator mixture phenol red/naphtholphthalein. At the marking lines of the scale, the respective concentration of cholinesterase is indicated which, in turn, corresponds to a certain amount of acetic acid liberated per unit time thus causing varying pH values and correspondingly different indicator hues. The color scale contains, in this case, merging shades of violet via red and orange to bright yellow. With the aid of a color scale calbirated in this manner, the cholinesterase content in the serum or plasma can be determined with a high degree of accuracy on the basis of the hues caused in a mixture of phenol red/naphtholphthalein and acetyl choline, or an acetyl choline salt. A color scale providing definite results in the evaluation of these color reactions is particularly important in the present case, since the choinesterase concentration of the blood plasma is used for diagnosis in certain diseases, and erroneous values can result in wrong diagnoses.

It is also possible to calibrate the color scale on the basis of parameters different from the ones set out above, for example, in accordance with the temperature, if temperature-dependent color reactions are to be evaluated. Thus, it is possible, for example, to employ an appropriately calibrated color scale of the present invention for the evaluation of the color changes of temperature-indicating colored coatings, for example, of reversible temperature-indicating mercury compounds, such as $$Ag_2(HgI_4), Hg(HgI_4)$$

or of irreversible temperature-indicating compounds, such as $[Cr(NH_3)_6]_4(P_2O_7)_3$, $NH_4VO_3$ for measuring the surface temperature, for instance when welding synthetic materials or when controlling the temperature of machine parts.

The color comparison scale required for this purpose is obtained by producing half-tones according to one of the above-described embodiments, which make it possible to conduct a four-color printing process of hues corresponding to different calibrating temperatures, in a continuously merging manner. The printed color strip is calibrated, upon comparison with the shades produced in connection with the calibrating temperatures, by printing marking lines and the respective temperature values at the corresponding places on the color strip.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Color comparison scale for the determination of pH values of between about 6 to 9, with the use of phenol red/ naphtholphthalein as the indicator (a) *Production and analysis of the calibrating colors for the printing sample of the color scale.*—In order to provide each calibrating color, an indicator paper strip is produced by immersing filter paper in a solution of 100 mg. phenol red and 100 mg. α-naphtholphthalein in 100 ml. methanol. After the filter paper is dried, it is saturated with a buffer solution, for example, a buffer solution according to Sörensen exhibiting one of the pH values set forth in Table 1 below.

For each of the hues formed on the different indicator strips, the proportion of the primary colors therein is determined by comparison with the color measuring charts which are commercially available. Accordingly, the hues caused at the different pH values have the following proportions of primary colors:

TABLE 1

| pH | Red | Yellow | Blue | Black |
|---|---|---|---|---|
| 5.8 | 0.20 | 1.00 | 0.00 | 0.00 |
| 6.1 | 0.32 | 1.00 | 0.00 | 0.00 |
| 6.4 | 0.48 | 0.96 | 0.00 | 0.00 |
| 6.7 | 0.64 | 0.88 | 0.04 | 0.00 |
| 7.0 | 0.80 | 0.72 | 0.08 | 0.00 |
| 7.3 | 0.92 | 0.56 | 0.12 | 0.00 |
| 7.6 | 0.96 | 0.40 | 0.20 | 0.00 |
| 7.9 | 1.00 | 0.28 | 0.28 | 0.00 |
| 8.2 | 1.00 | 0.16 | 0.40 | 0.00 |
| 8.5 | 1.00 | 0.08 | 0.52 | 0.00 |
| 8.8 | 1.00 | 0.04 | 0.64 | 0.00 |
| 9.1 | 1.00 | 0.00 | 0.76 | 0.00 |

The above values were obtained by forming the mean of various measurements and rounding the numbers up or down to integral multiples of 0.04.

The thus-determined intensities of the individual primary colors are entered graphically in dependence upon the pH value, the pH coordinate being additionally provided with the scale of length corresponding to the desired sample (in the present case: 1 cm. on the x-axis=0.2 pH stage, corresponding to 5 cm. of color strip supplied). Thus, the curves illustrated in FIGURE 1 are obtained.

(b) *Production of the printing sample.*—The sample for the printing of the color strip is produced on the basis of the curves obtained in accordance with (a) as follows: The printing colors, determined in accordance with the color measuring chart, of which the desired hues are composed according to the table, are sprayed, in a 10% chloroform solution, successively in correspondence with the intensities indicated in FIGURE 1 onto a rectangular sheet of paper having the dimensions of 100 cm. x 30 cm. If desired, the hues are completely matched with the given calibrating colors by repeating the spraying step with strongly diluted (about 0.5%) solutions of the colors. When cutting out the sample, a 5 cm. wide margin is discarded.

(c) *Printing of the color strip.*—On the basis of the sample prepared according to (b), the plates required for the four-color printing process and the zinc engravings are produced in a conventional manner. Then by means of the zinc plates, the color strip is printed in a conventional manner onto a support, for example, on chromo paper (art paper).

(d) *Calibration of the color strip.*—The strip is calibrated after printing by printing marking lines for the pH values at a spacing of 0.2 pH unit on those places of the strip corresponding to the respective calibrating colors with respect to their hues.

EXAMPLE 2

Color comparison scale for cholinesterase determination

The color scale described below serves for the evaluation of the color reaction produced by the enzyme cholinesterase after an incubation period of 6 minutes in liberating acetic acid, in the presence of acetyl choline and the indicator mixture of phenol red/naphtholphthalein. In this reaction, the rate at which the indicator color changes is characteristic of a corresponding cholinesterase concentration.

The sample is produced, and the color strip is printed as set out in Example 1, with the difference that the parameter with respect to length in the graphical representation (Example 1(b)) according to which the sample is sprayed is non-linear. The length parameter is spread out in the pH ranges which are of importance diagnostically (approximately pH 7.0 to 8.3, corresponding to a cholinesterase content of 0 to 3 international units/ml.), and in the diagnostically uninteresting areas of pH (pH<7.0 or >8.3) the calibration lines are moved closely together. By this means, minor changes in color and thus the diagnostically important reduced cholinesterase concentrations can be read off accurately, whereas for other pH ranges merely rough estimates of the cholinesterase content are sufficient.

For the calibration of the color strip in the present example an additional factor must be considered. Since the reaction velocity (change in pH per given unit of time) must form the basis of the calibration, and since the calibrating solution required in this case is not the solution of a weighed quantiy of cholinesterase in a liquid, but human serums with the cholinesterase concentrations incidentally present in these serums having in situ pH values, the calibrating process takes place as follows:

At first, a millimeter calibration is entered on the printed scale as a preliminary yardstick for length, so that each color shade corresponds to a specific mm. value (in the following called "color value $y$"). Then, the desired color reaction is produced by immersing one indicator paper respectively containing acetyl choline, phenol red, and naphtholphthalein in a number of serum samples of varying cholinesterase content (called $z$ in the following, expressed in international units per ml. of serum U/ml.]). At the beginning of the incubation period and after one additional minute of incubating respectively the thus-produced hue is compared with the printed color strip, and the color value corresponding to the hue is read off in mm. The shades ($y$, expressed in mm. of color strip) are graphically entered in dependence upon the incubation period (called $t$ in the following description). Thus, for a selection of serums, the curves illustrated in FIGURE 2a are obtained.

Thereupon, the cholinesterase concentration (in U/ml.) determined for the same serum samples by means of an exact method (titration of the liberated acetic acid in accordance with conventional methods).

Figure 2A:
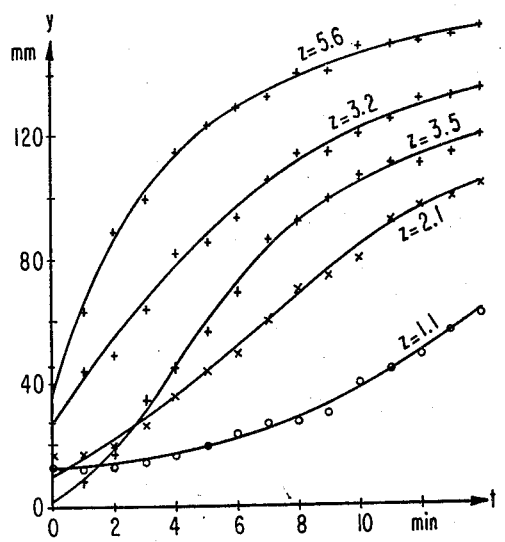
FIGURES 2a, 2b and 2c are graphs relating to the correlation of time, concentration and color for cholinesterase analysis.
Figure 2B:
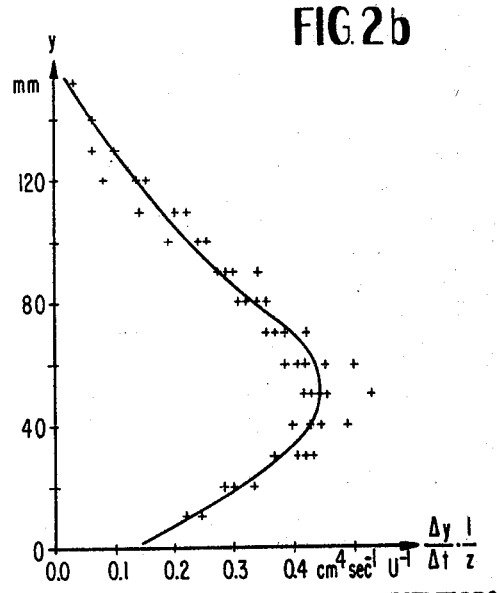
Figure 2C:
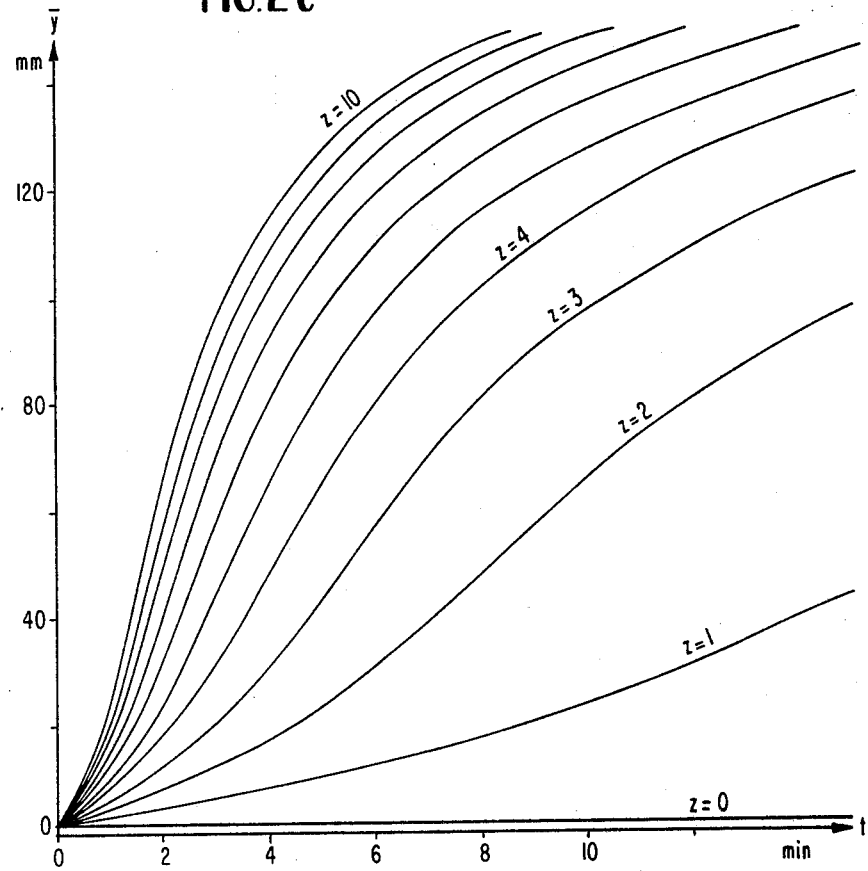

The slope $\Delta y/\Delta t$ of the curves in FIGURE 2a is determined for the values $y=0$, 10, 20, 30, 40, 50, 60, 70, 80, 90, 100, 110, 120, 130, 140, 150. Thereafter, these slopes $\Delta y/\Delta t$ are divided by the cholinesterase concentrations $z$ pertaining thereto, and plotted in dependence upon the color shades $y$ (expressed in mm. of color strip); see FIGURE 2b. The corresponding curve plotted in FIGURE 2b is a measure of the average velocity of the color change (expressed in mm. of color strip per minute) for serum containing 1 U/ml. of cholinesterase. From this measure, the median color shades (called $\bar{y}$ in the following, expressed in mm. of color strip) can be calculated for any desired cholinesterase concentrations in dependence upon the time, for example, for the cholinesterase concentrations $z=0$, 1, 2, 3, etc. up to $z=10$ (graphic integration). By graphically plotting the thus-obtained median color shades $\bar{y}$ in dependence upon the time $t$ for various concentrations $z$, the family of curves is obtained which is illustrated in FIGURE 2c the $\bar{y}$ value for $t=0$ (integration constant) is set to be=2). The $\bar{y}$ values for the time $t=6$ result in the position of the calibrating lines (expressed in mm. of color strip) at 6 minutes of incubation time. This calibration can be used for serums of any desired initial pH values. When at the beginning of the incubation a $y$ value is read off which deviates from zero, this value must be deducted from the $y$ value read off at $t=6$.

For control purposes, an error analysis is conducted thereafter. For this purpose, the cholinesterase content of a large number of serums is determined with the aid of the approximately calibrated color strip and additionally with the aid of an accurate comparison method. The differences between the two are graphically illustrated as a function of the read-off initial and final values. Thus by this method, even minor errors can easily be detected and eliminated by a corresponding correction of the calibration lines.

This type of calibration takes into account the differing initial pH values and the diffusing buffer capacities of the various serums, as well as the non-linear character of the scale.

Figure 2D:
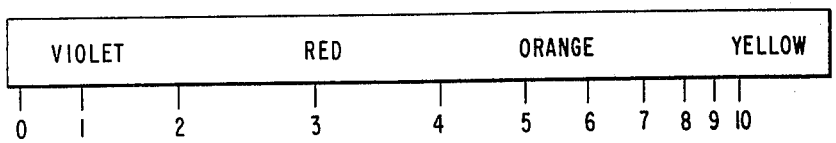
FIGURE 2d shows a color strip for cholinesterase analysis.

When employing the above-described procedure, the color comparison scale illustrated in FIGURE 2d is obtained.

EXAMPLE 3

Color strip for the rapid evaluation of paper or thin-layer chromatographic amino acid separations and for the semi-quantitative determination of amino acid with the aid of a ninhydrin test paper 0.005 ml. of a solution of 0.01, 0.02, 0.05, 0.1, 0.2, 0.5, 1, 2, 5, 10, 20, 50 and 100 mg. of alanine, respectively, in 10 ml. of water are applied side-by-side to filter paper. The paper is allowed to dry and is then immersed in a solution of 0.1 g. cadmium acetate, 10 ml. water, 5 ml. glacial acetic acid, and 1 g. ninhydrin in 100 ml. acetone.

Thereafter, the impregnated paper is allowed to lie in air for about 45 minutes, and the proportions of the basic colors in the thus-formed spots are determined with the aid of the color mixing charts commercially available. If color tables are used wherein there are no combinations with the various black proportions for the different blue-red-yellow mixtures, one or more transparent grey films are placed onto the color tables. The black proportions of these films are determined separately with the aid of the series of varying grades of blackness set forth in the table. The respective color proportions (obtained by producing the average value of various readings and rounding these results to integral multiples of 0.04) are tabulated in the following Table 2:

TABLE 2

| Amino acid concentration (mg. alanine/ml.) | Red | Yellow | Blue | Black |
|---|---|---|---|---|
| 0.01 | 0.20 | 0.00 | 0.00 | 0.04 |
| 0.02 | 0.20 | 0.00 | 0.00 | 0.04 |
| 0.05 | 0.20 | 0.00 | 0.00 | 0.08 |
| 0.1 | 0.24 | 0.00 | 0.00 | 0.08 |
| 0.2 | 0.28 | 0.00 | 0.04 | 0.12 |
| 0.5 | 0.40 | 0.04 | 0.16 | 0.12 |
| 1 | 0.48 | 0.08 | 0.28 | 0.12 |
| 2 | 0.56 | 0.16 | 0.40 | 0.12 |
| 5 | 0.68 | 0.20 | 0.48 | 0.12 |
| 10 | 0.76 | 0.24 | 0.52 | 0.12 |
| 20 | 0.84 | 0.28 | 0.56 | 0.12 |
| 50 | 0.88 | 0.28 | 0.60 | 0.12 |
| 100 | 0.88 | 0.28 | 0.60 | 0.12 |

According to Table 2, the individual primary colors are sprayed successively onto a white chromo paper, as described in Example 1. In this connection, a logarithmic concentration yardstick is selected proportional to the length of the color strip, in order to achieve, over a larger concentration range, an approximately equal visual color change per cm. of color strip and thus an approximately equal percentage of precise measurement capability across the length of the strip.

The production of the half-tone plates and the printing of the color strip in accordance with this sample are conducted in a stereotype printing plant as set forth in Example 1. After the color printing step, the calibrating colors are once again produced, as described in the present example, paragraph 2, and then calibration lines and the appropriate concentration data are printed at the hues corresponding to the calibrating colors.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A method of producing a color-comparison scale for the evaluation of colorimetric reactions comprising the steps of:
   (A) preparing a plurality of accurately known color reactions as calibrating hues;
   (B) reading off a conventional printer's graduated color chart the amount of each primary color in each calibrating hue;
   (C) applying said primary colors along the length of a sheet, corresponding to the amount of primary colors in each calibrating hue to obtain a continuous transition of colors, including said hues obtained from said accurately known color reactions;
   (D) employing a four-color half-tone printing process for printing the resultant colored length of sheet from step (C); and
   (E) calibrating the resultant printed color-comparison scale with the calibrating hues of step (A).

2. A color-comparison scale for the evaluation of colorimetric reactions;
said scale comprising a support and a continuous spectrum of applicable hues printed thereon by the half tone four color technique;
said applicable hues corresponding to continuously merging calibrating hues, said calibrating hues obtained by wetting indicator papers with a series of solutions having a range of actual concentrations of the chemical specie to be evaluated, said actual concentrations of said solutions having been previously precisely determined by an established method different from a color comparison method;
said scale having a series of graduating indicia thereon corresponding to said range of actual concentrations, said indica on said scale being calibrated after printing of said continuous spectrum, using as calibrating values said calibrating hues.

3. A color-comparison scale as defined by claim 2, wherein the hues of the color strip correspond to the hues produced by a mixture of phenol red and naphtholphthalein at pH values of about 6 to 9.

References Cited

UNITED STATES PATENTS 1,709,975   4/1929   Foshay _____ 35—28.3

OTHER REFERENCES

Webster's Third New International Dictionary Unabridged 1961, pp. 447, 448 and color plate facing page 448 only.

EUGENE R. CAPOZIO, Primary Examiner

HARLAND S. SKOGQUIST, Assistant Examiner

U.S. Cl. X.R.

356—191